United States Patent
Bennett et al.

[11] 3,914,039
[45] Oct. 21, 1975

[54] SLIDE CHANGING MECHANISM

[75] Inventors: Frank P. Bennett, Franklin Lakes, N.J.; Walter J. Hall, Evanston, Ill.

[73] Assignee: GAF Corporation, New York, N.Y.

[22] Filed: Aug. 1, 1974

[21] Appl. No.: 493,824

[52] U.S. Cl. ............................................. 353/114
[51] Int. Cl.[2] ........................................ G03B 23/14
[58] Field of Search .......... 353/103, 113, 114, 116; 40/79

[56] References Cited
UNITED STATES PATENTS

| | | | |
|---|---|---|---|
| 3,077,817 | 2/1963 | Ehemann | 353/113 |
| 3,336,836 | 8/1967 | Gould et al. | 40/79 X |
| 3,423,863 | 1/1969 | Heisler | 353/116 |

Primary Examiner—Harry N. Haroian
Attorney, Agent, or Firm—Walter C. Kehm; Arthur Dresner

[57] ABSTRACT

A container is provided to hold a plurality of slides in stack form and is detachably received on a supporting bed of a slide projector or viewer incorporating a slide changing mechansim, which includes a reciprocal slide changer. Shiftable elements engage the foremost slide in the stack and cooperate with the slide changer for advancing such foremost slide in its own plane from the container to the projection gate of the projector or viewer and for returning the slide to the container in that same plane. The shiftable elements, which are moved transversely of the path of movement of the slide changer in response to movement of the latter, are selectively operable alternately in two modes permitting the slides to be successively presented in "forward" and "reverse" sequences. The container acts as a magazine, is formed of simple and inexpensive construction, and may also be used by the film processor as a package for the slides.

27 Claims, 43 Drawing Figures

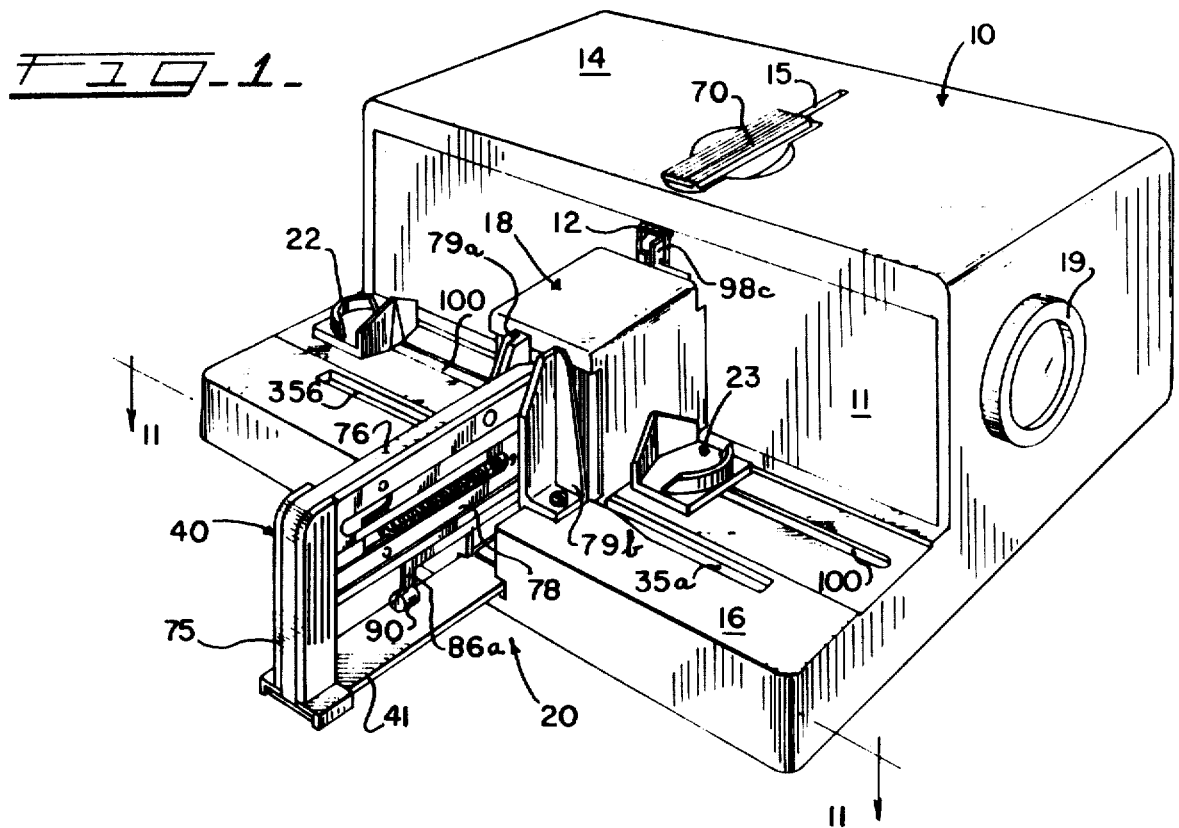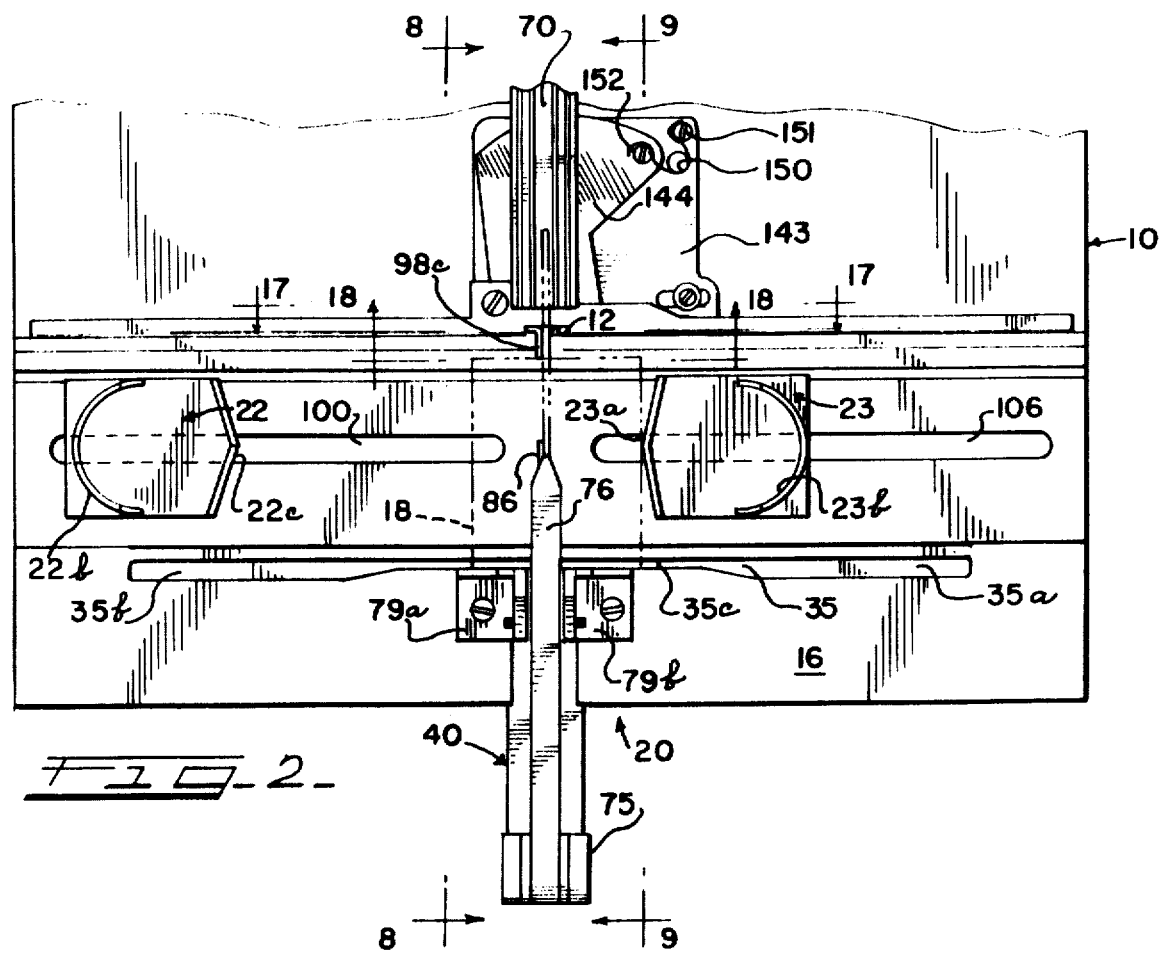

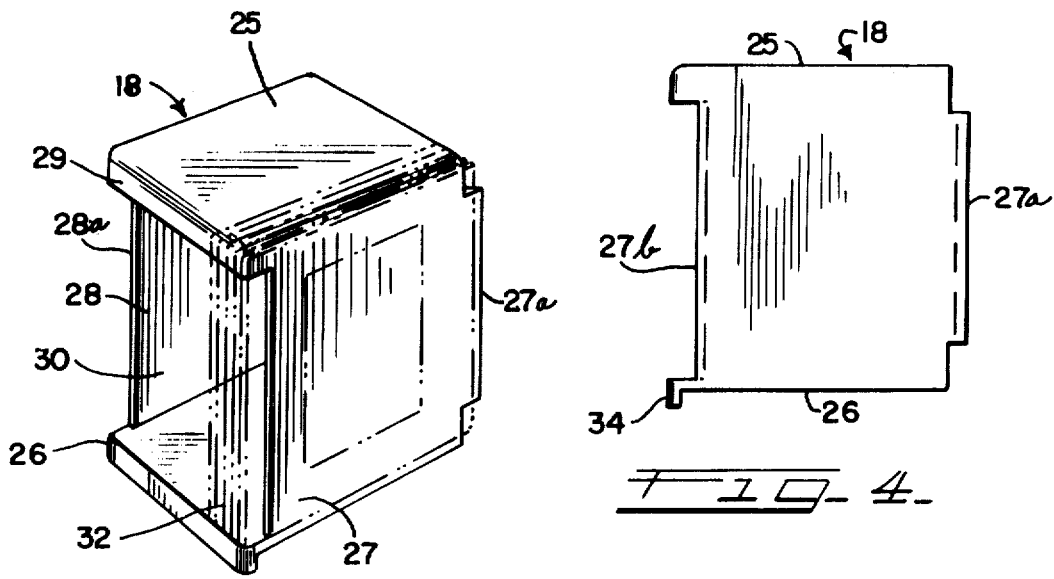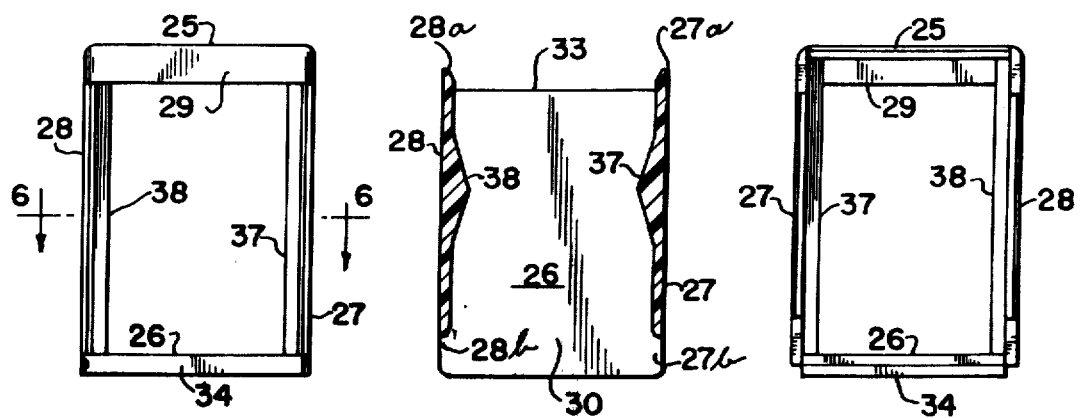

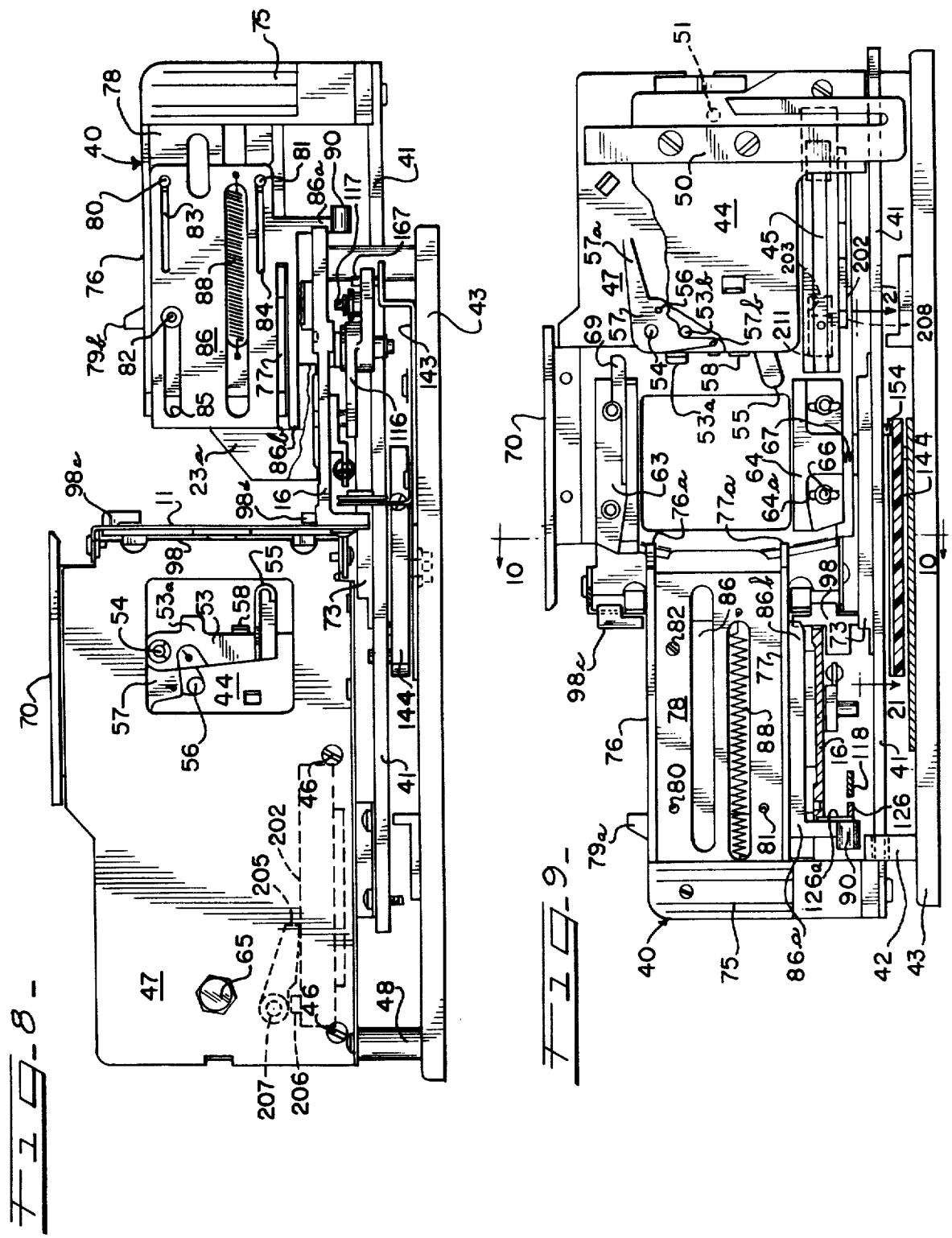

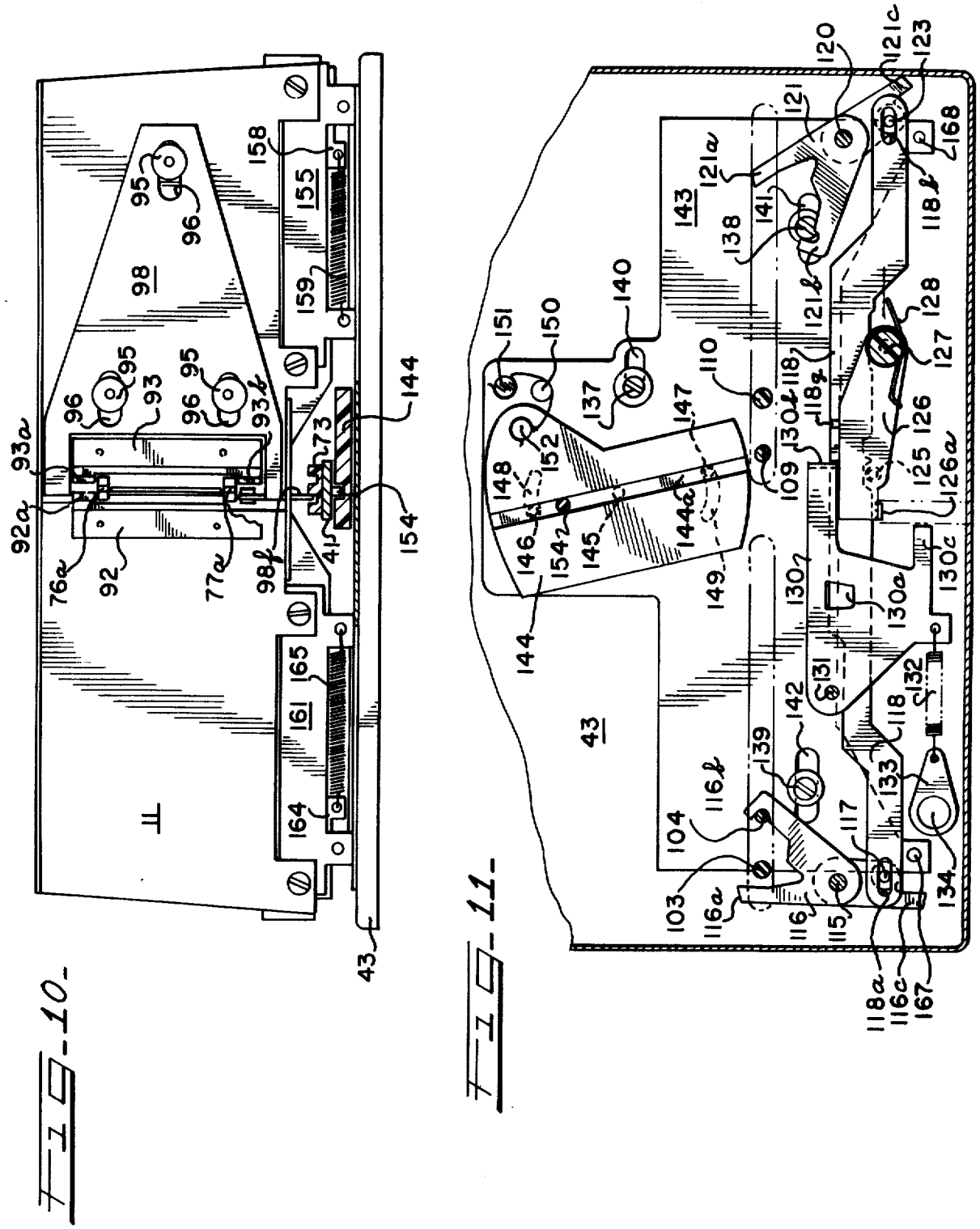

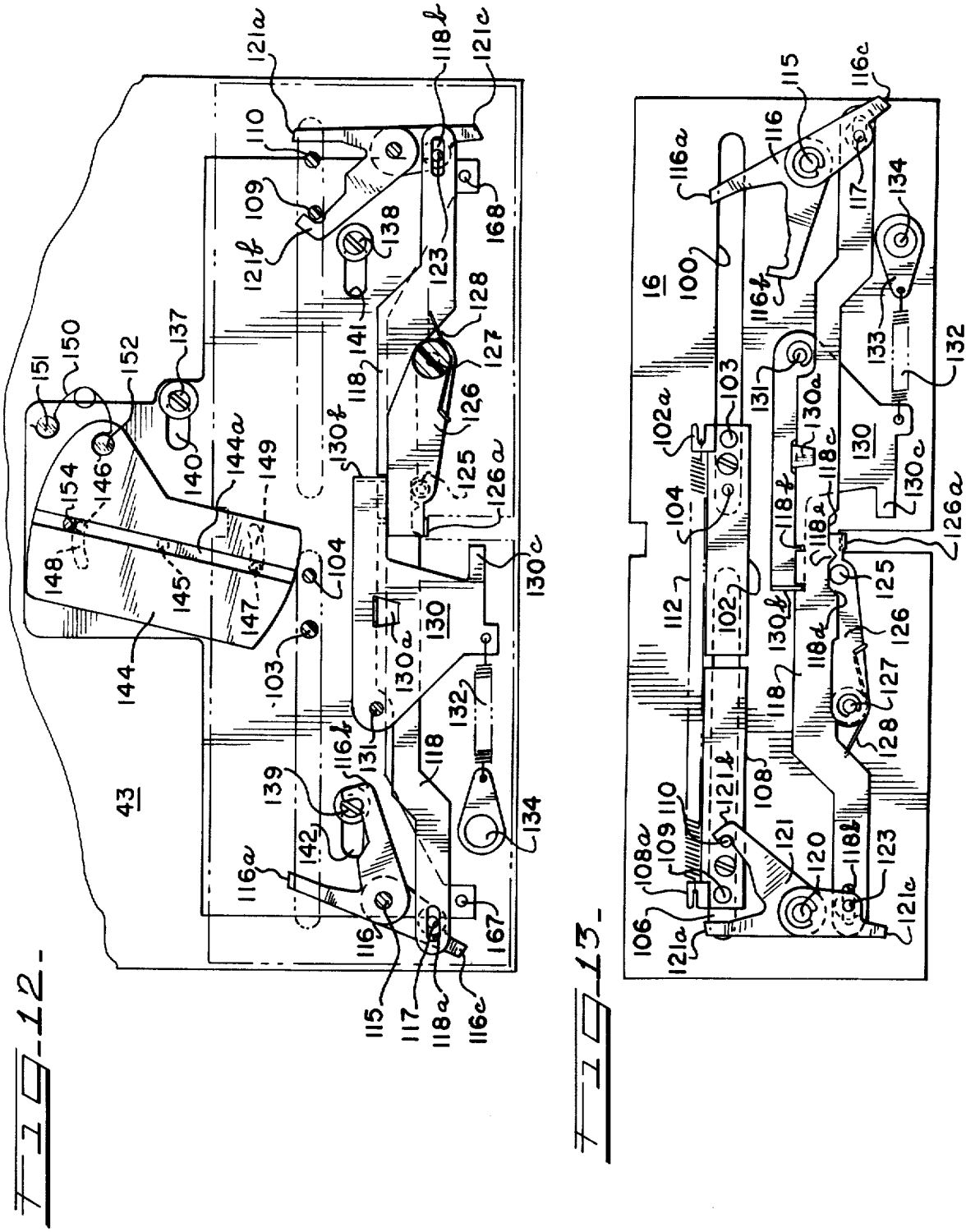

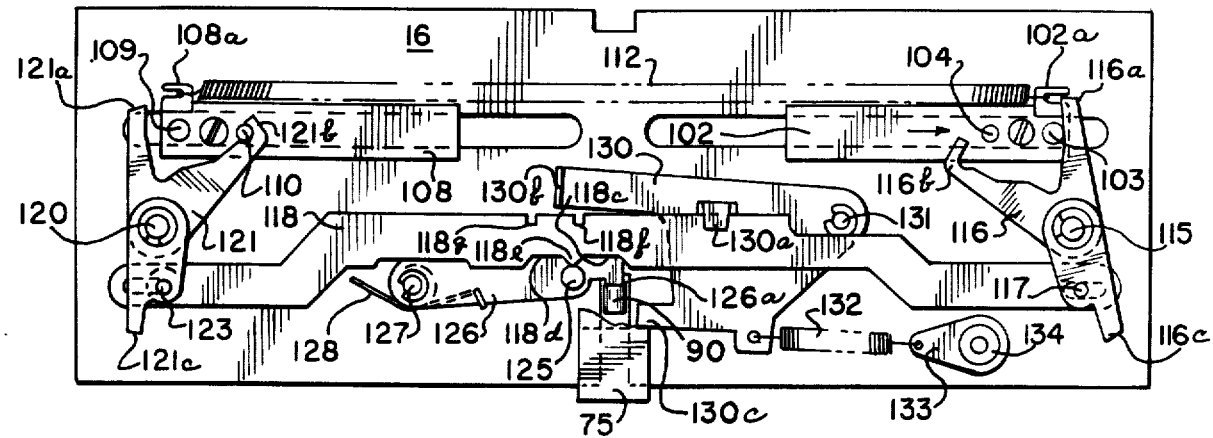
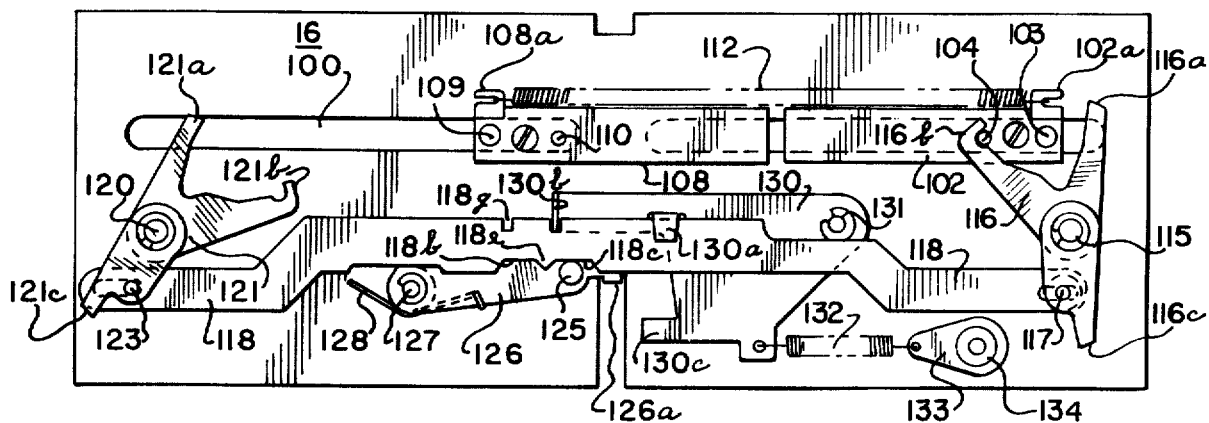
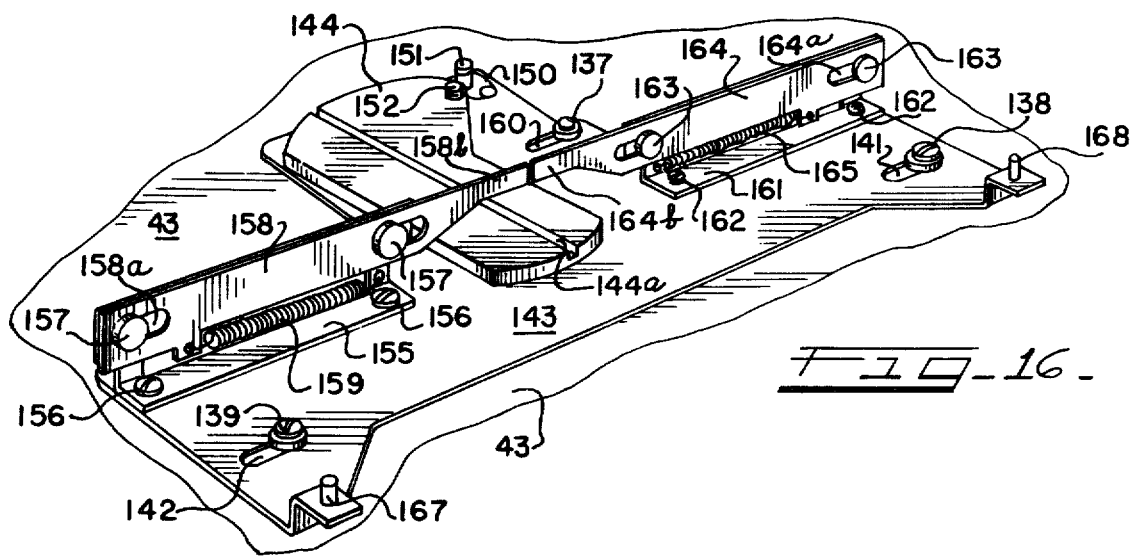

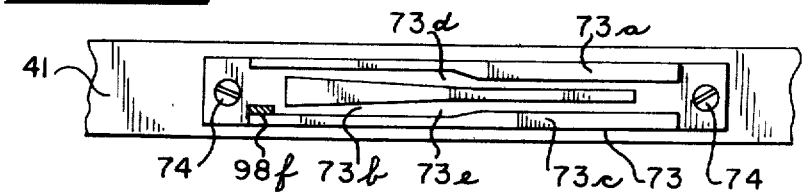
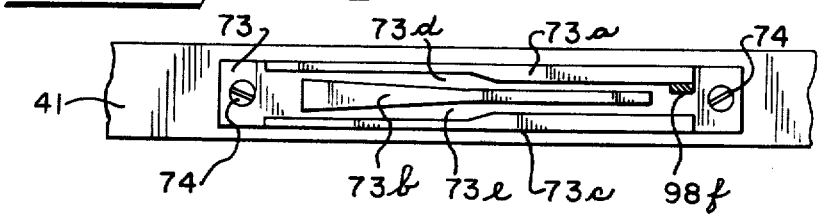
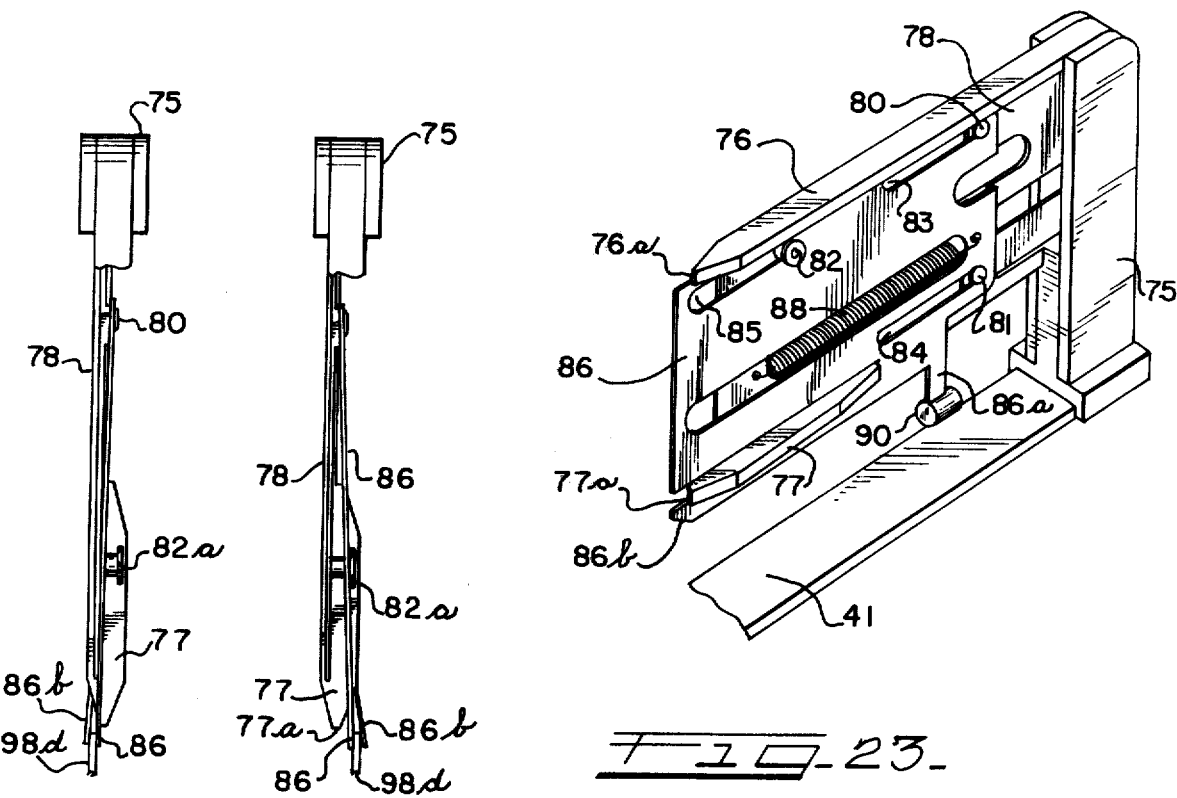

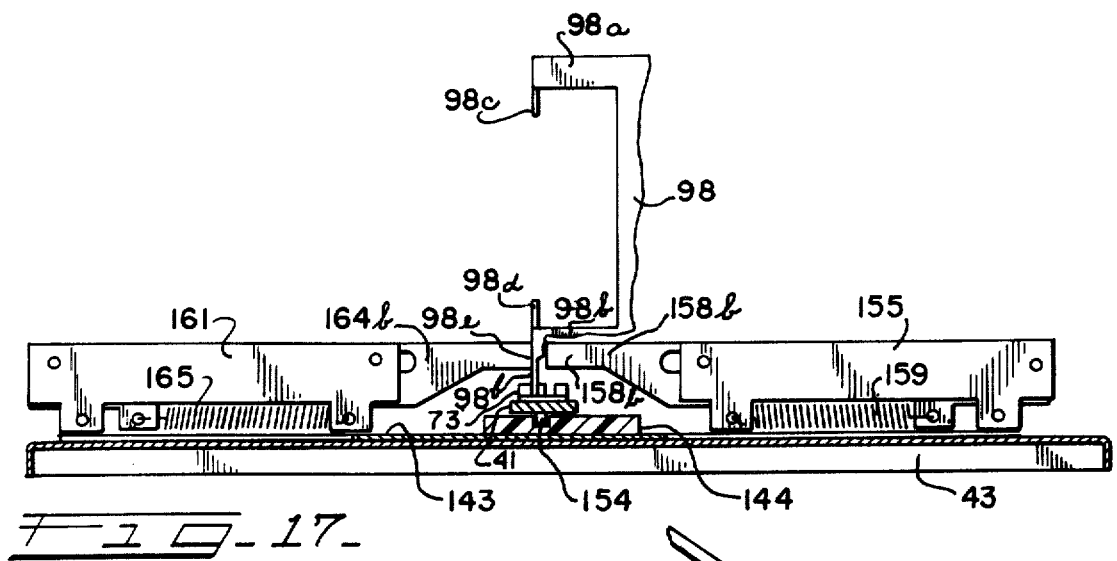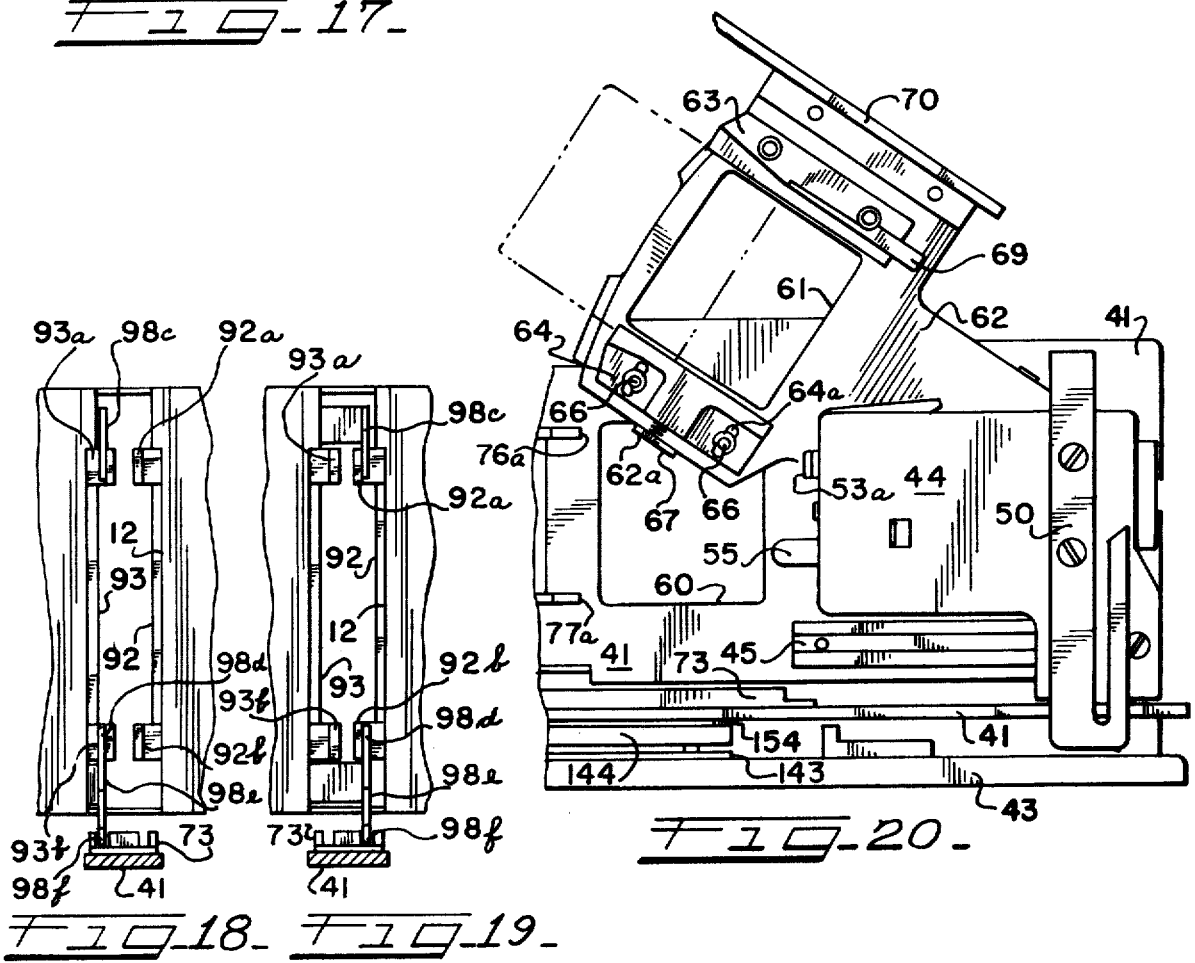

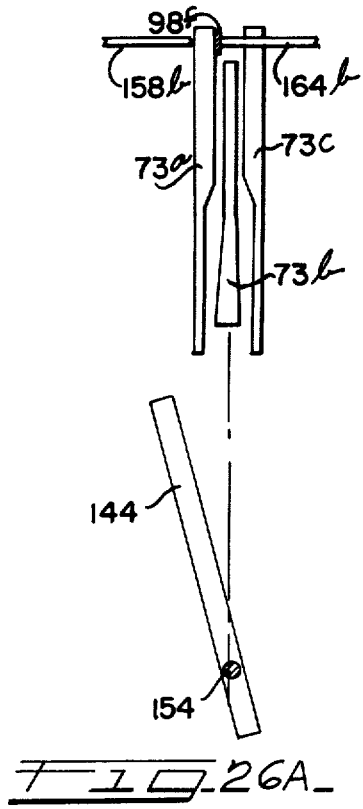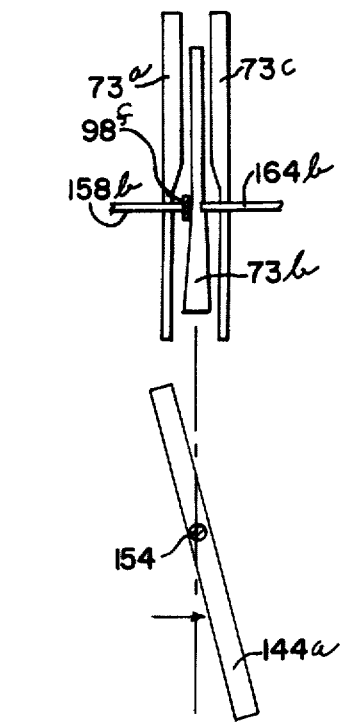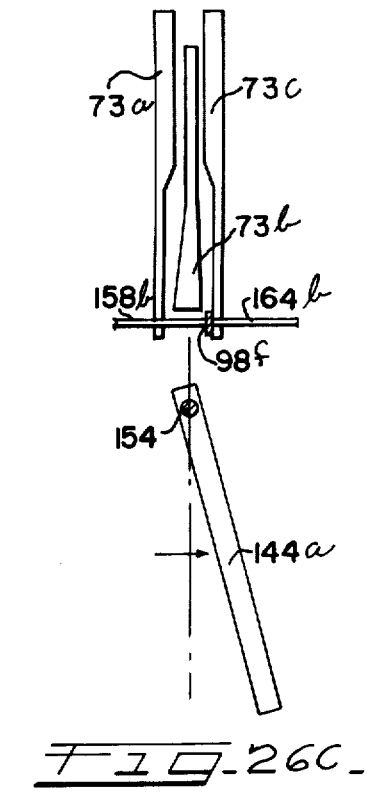
FIG.26A.  FIG.26B.  FIG.26C.
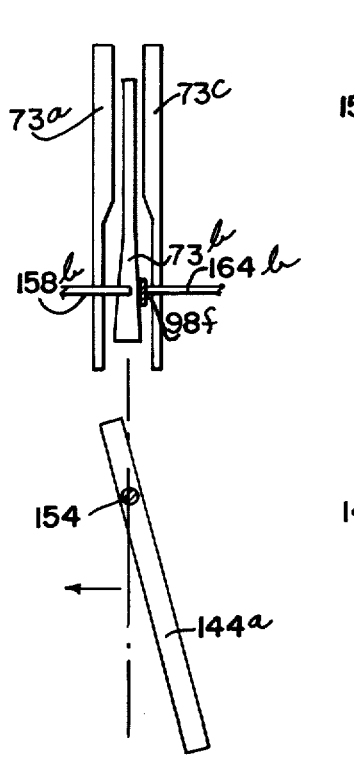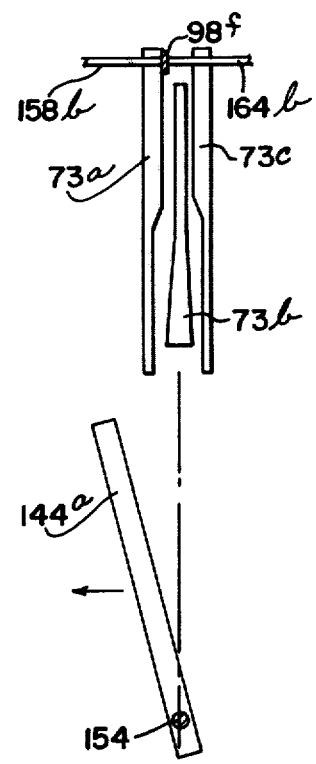
FIG.26D.  FIG.26E.

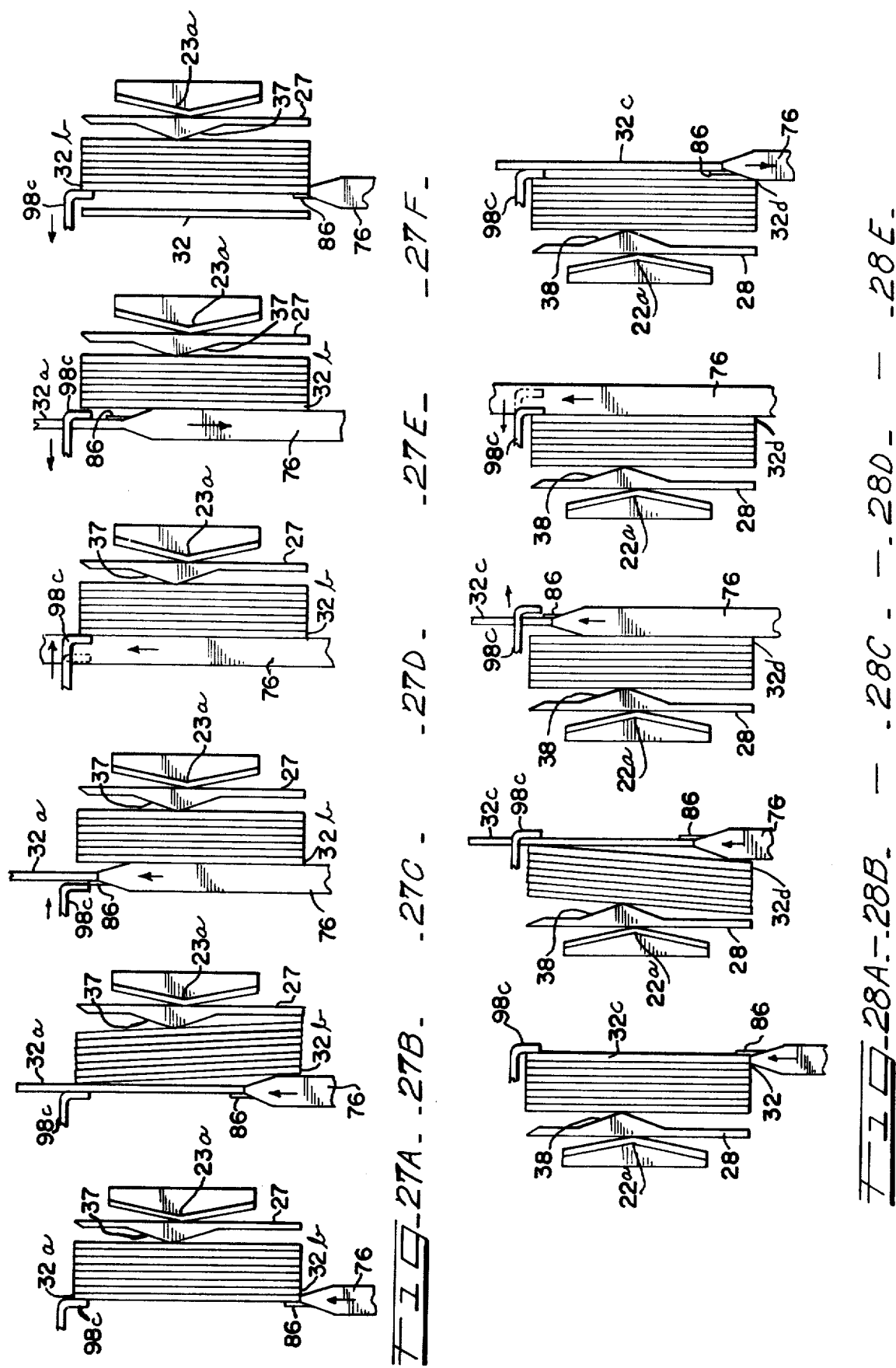

SLIDE CHANGING MECHANISM

BACKGROUND OF THE INVENTION

The field of the invention is that of a mechanism for advancing slides, i.e., 35 mm slide transparencies, from a supply of such slides to a projection gate in a projector or viewer and then returning each slide to a take-up area. More particularly, the field of the present invention relates to a slide-changing mechanism for use with slides held in stack form. The term "stack" does not imply any particular spatial orientation of the slides, i.e., vertical or horizontal, but rather has reference to the slides being held in intimate face-to-face contact as opposed to being held in spaced relation between the septums of a slide tray.

The following patents are representative of the prior art: U.S. Pat. Nos. to: Antos 2,503,239; Parlini et al 2,513,102; Parlini et al 2,532,442; Kollock 2,626,197; Jenkins 2,812,056; Rideout 2,858,628; Horton 2,864,190; Wiklund 2,877,580; Geiger 2,893,146; Walter 2,968,218; Ehemann 3,077,817; Heisler 3,423,863; and Zillmer 3,348,450; and German Patent 1,173,271 of January 14, 1965.

SUMMARY OF THE INVENTION

The invention may be summarized as relating to a slide changing mechanism having the following principal features:

a. A slide container which forms part of the slide changing mechanism and serves as a magazine for holding the slides in stack form. The container is of simple and inexpensive construction and may be used by film processors as a package for the slides.

b. The slide changing mechanism advances each slide in its own plane from the container to the projection gate and returns each slide to the container in the same plane, thereby simplifying construction of the gate and the means for holding the slides in stack form.

c. The slide changing mechanism is alternately operable in "forward" and "reverse" sequences.

A primary object of the present invention in the provision of a new and improved slide changing mechanism for advancing slides one at a time from a stack of such slides to a gate and for returning the slides to the stack.

Another object of the present invention is the provision of a slide changing mechanism of the type described which permits the slides to be successively presented to the gate alternately in forward and reverse sequences.

Still another object of the present invention is the provision of a new and improved slide changing mechanism for slides arranged in stack form, which mechanism includes a reciprocal slide changer having means to separate the foremost slide in the stack from the adjacent slide in prevent edgewise interference between such slides during sliding movement of the foremost slide in its own plane as it leaves the stack.

Another object of the present invention is the provision of a new and improved slide changing mechanism for use with slides arranged in stack form, wherein each slide is advanced in its own plane from the stack to the gate and is returned to the stack in that same plane.

Still another object of the present invention is the provision of a new and improved slide changer for use with slides arranged in stack form, wherein shiftable means are operated in response to movement of the slide changer for advancing slides one at a time from the stack to the gate and for returning the slides to the stack.

Another object of the present invention is the provision of a new and improved slide changer for use with slides arranged in stack form, wherein such changer may be operated in different modes for successively advancing the slides alternately in forward and reverse sequences, and wherein selection means are provided to determine the direction in which the slides are to be presented, such selection means also serving to actuate pressure applying means for holding the slides in stack form to be presented to the gate.

Still another object of the present invention is the provision of a container for holding slides in stack form, which container acts as a magazine and which also may be used by film processors as an inexpensive package for the slides.

Another object of the present invention is the provision of a new and improved slide transparency container of the type described, which container includes means cooperating with the slide changer to facilitate the rocking of slides thereby to minimize the possibility of edgewise interference between the slides as they are advanced one at a time from such container to the gate.

These and other objects and advantages of the present invention will become apparent from the following specification disclosing a preferred embodiment shown in the accompanying drawings.

DESCRIPTION OF THE DRAWINGS

FIG. 1 is a perspective view of a slide projector embodying the slide changing mechanism of the present invention and showing the slide changer substantially fully withdrawn;

FIG. 2 is an enlarged fragmentary top plan view of the slide changing mechanism with the slide changer intermediate the limits of its reciprocal path of travel;

FIG. 3 is a perspective view of the slide container;

FIG. 4 is an end elevation of the slide container;

FIG. 5 is a rear elevation of the slide container;

FIG. 6 is a section taken along the line 6—6 of FIG. 5;

FIG. 7 is a front elevation of the slide container;

FIG. 8 is a section taken along the line 8—8 of FIG. 2;

FIG. 9 is a section taken generally along the line 9—9 of FIG. 2, but showing the slide changer moved to the position for presenting a slide in the projection gate;

FIG. 10 is a section taken generally along the line 10—10 of FIG. 9;

FIG. 11 is an enlarged fragmentary section taken generally along the line 11—11 of FIG. 1, but showing the arrangement of parts with the slide changer in the position wherein a slide is positioned in the projection gate during the reverse mode of operation;

FIG. 12 is a section similar to FIG. 11 and showing the parts arranged for operating in the "forward" mode;

FIG. 13 is a bottom plan view showing the operation of certain of the parts shown in FIG. 12;

FIG. 14 is a bottom plan view similar to FIG. 13 showing the parts in a different sequence of operation;

FIG. 15 is a bottom plan view similar to FIG. 14 showing the parts in further sequence of operation;

FIG. 16 is a perspective view primarily showing the parts for operating the shiftable elements which cooperate with the reciprocal slide changer;

FIG. 17 is a section taken generally along the line 17—17 of FIG. 2 with certain parts being removed;

FIG. 18 is a section taken generally along the line 18—18 of FIG. 2 with certain parts being removed and showing shiftable ears disposed adjacent the left side of the entrance to the gate;

FIG. 19 is a section similar to FIG. 18 and showing the shiftable ears disposed adjacent the right side of the entrance to the gate;

FIG. 20 is a fragmentary elevation similar to FIG. 9 and showing operation of an editing device associated with the slide changing mechanism;

FIG. 21 is an enlarged section taken generally along the line 21—21 of FIG. 9 and showing the arrangement of parts when the slide changer is in the position wherein a slide is disposed in the projection gate;

FIG. 22 is a section similar to FIG. 21 and showing the arrangement of parts when the slide changer has been withdrawn to return a slide to the container;

FIG. 23 is a fragmentary isometric view of the reciprocal slide changer;

FIG. 24 is a top plan view of the portion of the slide changer shown in FIG. 23 with a part of the slide changer being broken away for better illustration of a shiftable tongue plate carried by such slide changer;

FIG. 25 is a fragmentary top plan view similar to FIG. 24 and showing another position of the shiftable tongue plate;

FIGS. 26A through 26E are top plan views, largely diagrammatic in form, showing the sequence of operation of certain parts of the slide changing mechanism in the reverse mode of operation;

FIGS. 27A through 27F are top plan views largely diagrammatic in form, showing the sequence of operation of the slide changing mechanism in the reverse mode of operation; and FIGS. 28A through 28E are top plan views, largely diagrammatic in form, showing the sequence of operation of the slide changing mechanism in the forward mode of operation.

DESCRIPTION OF A PREFERRED EMBODIMENT

GENERAL

Figure 9A:
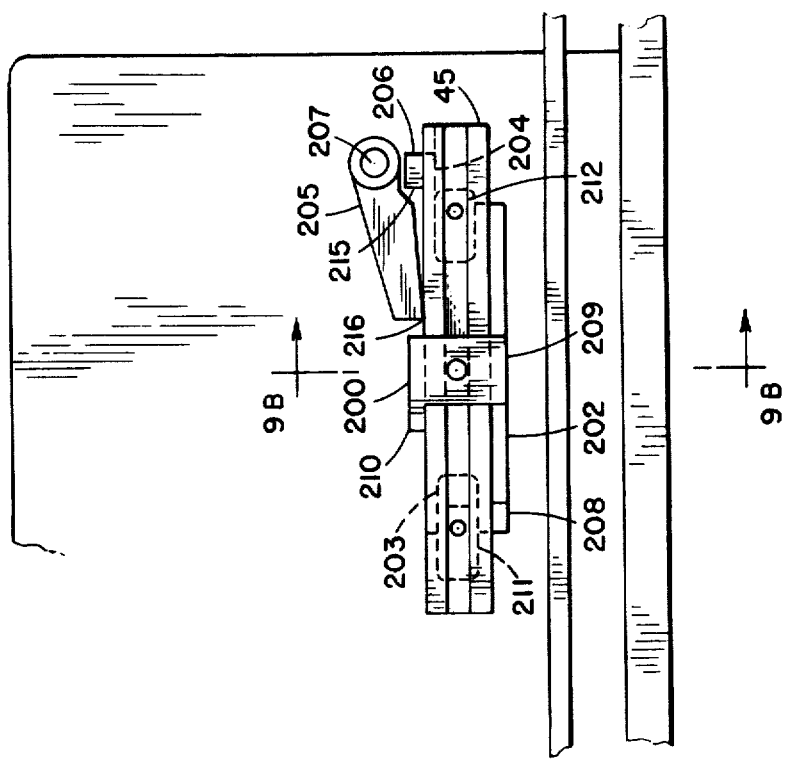
FIG. 9A is a partial elevation of a locking means for the slide changer.
Figure 9B:
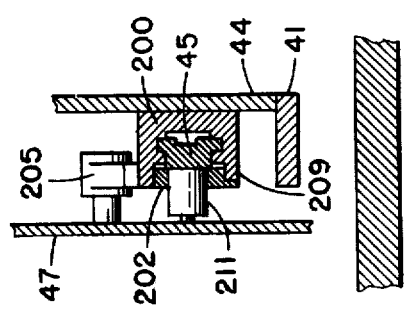
FIG. 9B is a section taken generally along the line 9B—9B of FIG. 9A.

Referring to FIG. 1, the slide changing mechanism of the present invention is shown incorporated in a slide projector having a housing, generally designated 10. The housing includes a vertical wall 11 having a slot 12 therein defining the entrance to the projection gate. The housing also has a top wall 14 with a slot 15 defining the opening for a slide editor to be explained hereinbelow. Finally, the projector housing includes a horizontal surface or bed 16 for supporting a slide holder or container, generally designated 18. The optical system of the slide projector, which includes the usual adjustable objective lens barrel 19; may take a variety of forms, all well known to those skilled in the art, and therefore will not be described herein.

At this time it should be mentioned that the present invention is not to be limited for use with the particular slide projector illustrated, or with slide projectors for that matter. The present invention has equal utility with slide viewing devices, for example.

Still referring to FIG. 1, the slide changing mechanism of the present invention, generally designated 20, advances the slides one at a time from the container 18 to the projection gate and returns each slide to the container. A pair of pressure applying elements or pushers 22, 23 alternately engage the container 18 for indexing or advancing the latter in response to slide changer movement as will be explained in detail below.

The Slide Container

Referring now to FIGS. 3 through 7, the slide container 18 is generally in the form of a parallelopiped and includes top and bottom walls 25, 26, respectively, and end walls 27, 28. A rib 29 depends integrally from the top wall 25 and cooperates with the other walls to define an opening 30 in one side of the container. This opening is sufficiently large to permit entrance of the slide changer 20; this opening is not large enough to permit exit of the slides 32, or in other words, the rib 29 acts as a stop to prevent exit of the slides through the opening 30. The side of the container 18 opposite the opening 30 is defined by an opening 33 which permits ingress and egress of slides.

The bottom container wall 26 has an integral depending flange 34 which is received in a guideway 35 (FIG. 2), the latter being formed in the bed 16 of the projector housing. The groove 35 is widened at opposite ends 35a, 35b thereof and has a narrow central portion 35c. The widened portion of the guideway facilitate mounting of the container 18 in place; the narrowed central portion of the guideway serves to guide the container during the portion of its travel wherein slides are advanced from the container and returned thereinto.

Referring to FIG. 6, it is seen that the end wall 27 has an integral peaked formation 37. Similarly, the end wall 38 has an oppositely disposed, integral peaked formation 38. As will be seen hereinbelow, these formations alternately act as fulcrums to facilitate rocking of the slide or slides adjacent the slide being advanced.

The end wall 27 of the container 18 has cutout corners defining an extension 27a which is beveled to facilitate return of a slide to a position adjacent such end wall. Likewise, the other end wall 28 has cutout corners defining an extension 28a which is also beveled. Each of the end walls has a recess 27b, 28b.

The container 18 is adapted to hold a plurality of slides 32 in stack form as illustrated in phantom lines in FIG. 3. The container 18 must not be completely filled with slides, as it is necessary to leave a space for reception of the reciprocal slide changer. Suitable indicia, such as a line or mark on one or more of the walls of the container 18, may be provided to indicate the extent to which the container 18 may be filled and yet provide the necessary space for the slide changer.

It is noted that the container 18 does not include springs or other biasing means therein for holding the slides therein in stack form; accordingly, the container itself may be of very simple and inexpensive construction. Thus, the container may serve not only as a slide magazine, but may be used by the film processor as inexpensive packaging for the slides.

The container 18 is preferable provided with a cover (not shown) which may be snapped on to close the opening 33 when the container 18 is not being used. Suitable slide retaining means (not shown) engageable with edges of the slides may be provided to prevent the slides from falling from the container 18 when the container is being handled with such cover removed. In other words, such retaining means would prevent falling of the slides from the container 18 if the user inadvertently tipped the same during handling prior to mounting the container on the bed 16 of the projector housing.

The Reciprocal Slide Changer and Associated Mechanism

With particular reference to FIGS. 1, 8, 9, 9A, 9B, and 20, the slide changer, generally designated 40, includes a bar 41 slidably received in an opening formed in a block 42, the latter being mounted from a plate 43 which may define the base of the projector housing. The bar 41 mounts a vertically disposed plate 44; this plate carries a guide block 200 (shown in FIGS. 9A and 9B) slidably engaging the top and bottom edges of a guide bar 45. The guide bar has a pair of rectangularly shaped mounting pads 211 and 212 which are attached by a pair of fasteners 46 to a plate 47, which plate is fixedly mounted by suitable means including a post 48.

At this time it should be mentioned that the slide changing mechanism of the present invention is not to be limited for use with the container 18. Such mechanism has equal utility with other means for holding the slides in stack form and for receiving the slides upon return from the gate.

The plate 44 carries a so-called j-bar 50 for receiving the pin 51 of a powered drive mechanism of the type shown in Kurz U.S. Pat. No. 3,183,774, assigned to the assignee of the present application. It will be understood that such pin is driven in a circular path for reciprocating the slide changer from the position shown in FIG. 9 to the position shown in FIG. 1 and then back to the FIG. 9 position, the latter defining what may be termed a "rest" or projection position. By reason of the j-bar arrangement, it will be understood that the slide changer 40 may also be manually reciprocated, the shape of the j-bar 50 permitting separation of the latter from the pin 51 as indicated in FIG. 9.

The slide changer 40 can be provided with locking means of the type shown in Bennett U.S. Pat. No. 3,460,890, assigned to the assignee of the present application, to prevent retrograde movement of the slide changer after it has commenced movement in either direction and until it has completed its movement in that direction. Such locking means prevents the operator from manually operating the slide changer in a manner that could cause jamming of the slides.

In the preferred embodiment, however, as shown in FIGS. 8, 9, 9A and 9B, the slide changer locking means comprises a catch 205 pivotally attached to plate 47 by means of a fastener 207, and a catch release member 202 slidably mounted on the rectangular mounting pads 211 and 212 of guide bar 45. The catch is normally urged by gravity or biasing means, such as a spring, into a downwardly disposed locked position as shown in FIG. 9A, in which position it permits outward movement of the slide changer guide block 200, but prevents inward movement thereof. The catch release member 202 is formed at the ends with rectangular cutout portions 203 and 204 which, respectively, engage the guide bar mounting pads 211 and 212 to permit sliding reciprocal movement of the catch release member between a locking position as shown in FIG. 9A in which the web portion of cut-out 204 abuts the side of pad 212, and an unlocking position as shown in phantom in FIG. 8 in which the web portion of cut-out 203 engages the side of pad 211. An upstanding tab 206 is formed at one end of catch release member 202 and adapted to clear catch 205 in the locking position, and to lift catch 205 into an unlocked position to permit inward movement of the slide changer guide block 200 when the catch release member is moved to its unlocking position.

The slide changer guide block 200 provides the motive force to lock and unlock the catch. A tab 209 is formed on a lower corner of the block and is adapted to abut a corresponding tab 208 formed on a lower corner of catch release member 203 during outward movement of the slide changer 40. A second tab 210 is formed on an upper corner of block 200 and is adapted to abut the tip 216 of catch 205 during inward movement, when the catch is in its locked position, to stop such movement, and to abut tab 206 during inward movement when the catch 205 is in its unlocked position.

When the slide changer 40 is in its inwardly-most position as shown in FIG. 9, the catch release member is in its locking position and tab 210 on block 200 is in abutting engagement with tab 206 on the catch release member. As the slide changer 40 is withdrawn, tab 210 engages inclined surface 215 of catch 205 to lift the catch and permit movement of block 200. When tab 210 passes the tip of catch 205, the catch is urged into its locked position and thereby prevents retrograde movement of the slide changer. Continued withdrawal of the slide changer causes tab 209 of block 200 to engage tab 208 of the catch release member, so that further outward movement of block 200 causes the catch release member 203 to move into its unlocking position whereby tab 206 engages and lifts catch 205 to its unlocked position. Once in the unlocked position, the slide changer may again be inserted to advance the next slide. As such movement commences, the catch release member remains in its unlocking position holding catch 205 out of the way of tab 210, so that tab 210 may pass beneath catch 205 prior to its engagement with tab 206. The catch release member is then moved into its unlocking position, permitting catch 205 to drop into its locked position.

The plate 44 pivotally mounts a leg 53, as by means of a pin 54. This leg includes an integral foot 55 adapted for engagement with a vertical edge surface of a slide so as to return the same from the projection gate to the slide container. A coil spring 56 has one end thereof engaged with the leg 53 and the other end thereof engaged with an arm 57, which arm is also pivotally mounted about the pin 54. When the distal end 57a of the arm 57 is urged downwardly by engagement with a cam to be referred to below, such arm yieldably urges the leg 53, through the agency of the spring 56, in a counterclockwise direction (FIG. 8), movement of the leg 53 in this direction being limited by a stop tab 58 integral with the plate 44. Clockwise movement of the arm 57 (FIG. 9) relative to the leg 53 is limited by engagement of the arm portion 57b with a lug 53a, the latter being formed integrally with the leg 53; counterclockwise movement of the arm 57 relative to the leg 53 is limited by engagement of the arm portion 57b with a stop pin 53b integral with the leg 53.

The projection gate is primarily defined by an opening 60 in the plate 47, an opening 61 in a plate 62, and by a pair of upper and lower guide tracks 63, 64, respectively. The plate 62 is mounted from the plate 47 by a fastener 65 for swinging movement back and forth between the "project" position shown in FIG. 9 and the "edit" position shown in FIG. 20. The plate 62 mounts the guide tracks 63, 64 which include suitable longitudinally extending grooves slidably engaging upper and lower edge portions of a slide thereby to hold the latter in place for projection. Preferably, the lowermost guide track 64 includes a pair of vertically extending slots 64a slidably receiving a pair of pins 66 mounted from the plate 62. A spring 67 has opposite ends thereof engaging the underside of the guide track 64 and a tab 62a for yieldably urging the guide track 64 upwardly to compensate for differences in the vertical dimension of the slides due to tolerance variations and thereby to hold each slide snugly in the projection gate.

The upper guide track 63 includes a cam track 69 which is engaged by the end 57a of the arm 57 during reciprocal movement of the slide changer 40. This engagement between the arm 57 and the track 69 serves to bring the pushing surface 55 into operation for returning each slide during corresponding movement of the slide changer 40.

The plate 62 mounts a bar 70 which serves as a grasping handle thereby permitting the operator to swing the plate 62 upwardly through the housing slot 15 to the "edit" position shown in FIG. 20. In this position, a slide may be withdrawn from the guide tracks 63, 64, as indicated in phantom lines in FIG. 20, for the purpose of editing.

The present invention includes interlock means to prevent movement of the plate 62 to the edit position shown in FIG. 20 except when the slide changer 40 is in or very near the position shown in FIG. 9 and also to prevent movement of the slide changer when the plate 62 is in the edit position. As soon as the slide changer 40 is moved a short distance to the left from the position shown in FIG. 9, the slide pushing member 55 extends over the lower guide track 64 thereby to be engaged by the latter to prevent upward swinging movement of the plate 62. When the plate 62 is in its upper or edit position as shown in FIG. 20, the lower guide track 64 is positioned in the path of movement of the leg 53 thereby serving as a stop to prevent full reciprocal movement of the slide changer. It is apparent such interlock means prevent the operator from misusing the editing mechanism which could result in jamming of the slides.

The bar 41 mounts a block 73 intermediate the ends thereof, as by means of a pair of fasteners 74 (FIGS. 21, 22). The block 73 includes integral, upstanding ribs 73a, 73b, 73c defining a pair of cam tracks 73d, 73e. The function of these cam tracks will be explained hereinbelow.

The slide changer bar 41 supports an upstanding member 75 at one end thereof, which member serves as a handle facilitating manual reciprocating movement of the slide changer. The member 75 mounts a slide pushing member consisting of upper and lower bars 76 and 77, respectively, joined together by a web plate 78. The bars 76, 77 are slidable between a pair of upstanding guides 79a, 79b, the latter being fixedly mounted from the bed 16 forming part of the projector housing. The bars 76, 77 have their distal ends tapered thereby to define slide pushing surfaces 76a, 77a. It will be understood these surfaces have a width approximately equal to the thickness of the type of slide transparency to be handled, i.e., either cardboard mounts or plastic mounts, and serve to engage a vertical edge of each slide so as to advance the same from the container to the gate as will be explained below.

As noted in FIGS. 24 and 25, the web plate 78 is offset with respect to the longitudinal center lines of the bars 76, 77. The web plate mounts pins 80, 81 and 82 which are received within respective slots 83, 84 and 85 formed in a tongue plate 86. A spring 88 has one end thereof secured to the tongue plate 86 for yieldably holding the latter in the position shown in FIG. 23 with the pins 80 through 82 engaged by corresponding ends of the slots 83 through 85. Manifestly, the spring 88 permits sliding movement of the tongue plate 86 relative to the web plate 78 to the right as viewed in FIG. 23.

As seen in FIGS. 24, 25, the distal end of the tongue plate 86 is also mounted for shifting movement relative to the tongue plate 78 generally laterally of the direction of movement of the slide changer. The pin 82 has an enlarged head 82a so as to limit such shifting movement of the plate 86 away from the web plate 78 as noted in FIG. 25.

The tongue plate 86 has an integral depending portion 86a which carries a small magnet 90, the latter being disposed to engage a metallic stop (to be explained below) when the slide changer is moved inwardly toward the gate. As will be explained below, the plate portion 86a serves as a finger engaging member to permit the operator to slide the tongue plate 86 relative to the web plate 78 when the slide changer 40 is in the position shown in FIG. 1. It should be observed from FIG. 23 that the plate 86 has another portion 86b which normally is coplanar with the main portion of the tongue plate.

Referring primarily to FIGS. 10, 18 and 19, the housing wall 11 mounts a pair of vertically disposed guide bars 92, 93, one adjacent each side of the slot 12 forming the entrance to the projection gate. The bar 92 includes integral guide surfaces 92a, 92b; similarly, the other bar 93 includes integral guide surfaces 93a, 93b. The guides 92a, 93a cooperate to engage opposite upper marginal portions of a slide so as to guide the upper portion of the slide to the guide track 63. In like manner, the guides 92b, 93b cooperate opposite lower marginal portions of a slide for guiding that portion of the same to the lower guide track 64.

The housing plate 11 supports pins 95 slidably engaging horizontally elongated slots 96 formed in a shiftable gate plate 98. By reason of such pin and slot mounting, it will be understood that the plate 98 is mounted for horizontal reciprocal or shifting movement transversely of the direction of movement of the reciprocal slide changer 40. As best seen in FIGS. 17 through 19, the shiftable gate plate 98 includes receptive upper and lower extensions 98a, 98b. The extension 98a is integral with an ear 98c which is generally planar in shape, which extends through the vertical slot 12 and which is shiftable across the guides 92a, 93a in response to corresponding shifting movement of the gate plate 98. Similarly, the extension 98b is integral with an ear 98d which is coplanar with the ear 98c, which extends through the slot 12 and which is shiftable across the guides 92b, 93b in response to corresponding shifting movement of the gate plate 98. Finally, the extension 98b of the shiftable plate has an integral depending portion 98e, the latter terminating in a cam follower 98f.

The cam follower 98f cooperates with the cam tracks 73d, 73e as will become apparent hereinbelow.

Turning now primarily to FIGS. 1, 2 and 14, the projector bed plate 16 includes a slot 100 slidably receivig a block (not shown), which block mounts the pressure applying element or pusher 22 as well as a bar 102. The pusher 22 includes an integral peaked surface 22a for engagement with one wall of the container 18. The pusher also includes an upstanding, arcuate wall 22b serving as a thumb engaging member to permit the operator to withdraw the pusher or slide the same to the left as viewed in FIGS. 1 and 2. With particular reference to FIG. 14, it will be understood that the bar 102 mounts a pair of depending pins 103, 104.

The bed plate includes another slot 106 in colinear relation with the slot 100. The slot 106 slidably receives a block (not shown) mounting the other pressure applying element or pusher 23 and another bar 108. The pusher 23, which is identical to and occupies an opposite hand relation with the pusher 22, includes a peaked surface 23a and a thumb engaging member 23b. The bar 108 supports a pair of depending pins 109 and 110.

A coil spring 112 has one end thereof secured to an extension 102a integral with the bar 102 and has the other end thereof connected to an extension 108a integral with the bar 108. The spring 112 acts to urge the bars 102, 108, and the several parts connected thereto, toward each other.

The bed plate 16 supports a depending pin 115 pivotally mounting a lever 116 having arms 116a, 116b, 116c. The arms 116a, 116b are arranged to be alternately engaged by the pins 103, 104 carried by the pusher 22. The arm 116c carries a pin 117 slidably received in a slot 118a formed in one end of a bar 118. The bed plate 16 supports another depending pin 120 pivotally mounting a lever 121, which lever includes arms 121a, 121b and 121c. The arms 121a, 121b are adapted to be alternately engaged by the pins 109, 110 carried by the pusher 23. The lever 121, which is an opposite hand version of the lever 116, mounts a pin 123 secured within a slot 118b formed in the other end of the bar 118.

The bar 118 includes a pair of recesses 118c, 118d for alternately receiving a pin 125 carried by a distal end of the arm 126, the latter being pivotally mounted, as by means of a pin 127. The pin 127 depends from the bed plate 16. A coil spring 128 engages the arm 126 and acts to hold the pin in yieldable engagement with one or the other of the recesses 118c, 118d which are separated by a peaked formation 118e. The arm 126 has an upstanding formation 126a acting as a stop for the magnet 90 on the tongue plate 86 (FIG. 9).

An interlocking plate 130 is swingably mounted by a pin 131, the latter depending from the underside of the bed plate 16. The plate 130, which is mounted between the bed plate 16 and the bar 118, has a tab 130a struck therefrom. This tab extends beneath the bar 118 and serves to maintain the plate 130 in parallel relation with the bar 118 during movement relative to the latter. The plate 130 has a depending ear 130b adapted for alternate reception in notches 118f and 118g formed in the bar 118. A coil spring 132 has one end thereof connected with the plate 130 and the other end thereof connected to a bracket 133. This bracket is mounted by a post 134, which post extends between the bed plate 16 and the base plate 43. It will be understood that the spring 132 acts to urge the plate 130 in a clockwise direction (FIG. 11) with the ear 130b received in one or the other of the notches 118f, 118g formed in the bar 118. As best seen in FIG. 14, the plate 130 has a portion 130c adapted to be engaged by the member 75 of the slide changer 40 so as to disengage the ear 130b from one or the other of the notches 118f, 118g.

Referring primarily to FIGS. 11, 12 and 16, the base plate 43 mounts pins 137, 138 and 139 received in respective slots 140, 141, 142 formed in a shiftable plate 143. It will be understood that by reason of this pin and slot mounting, the plate 143 is mounted for reciprocal shifting movement transversely of the direction of movement of the slide changer 40.

A forward-reverse cam block 144 is pivotally mounted on the shiftable plate 143, by means of a pin 145. This pivoting movement of the cam block is limited by engagement of pins 146, 147, which are integral with the block 144, with opposite ends of respective arcuate slots 148, 149, the latter being formed in the plate 143. An overcenter type spring 150 has its opposite ends engaged with pins 151, 152 mounted on the plate 143 and block 144, respectively, for yieldably holding the block 144 in each of the two positions thereof as illustrated in FIGS. 11 and 12.

The cam block 144 includes a rectilinear cam track 144a. As noted in FIG. 9, this cam track receives a cam follower pin 154, which pin is carried by the slide changer bar 41 and depends from the latter.

The shiftable plate 143 mounts an angle bracket 155, as by means of fasteners 156. The upstanding portion of the angle bracket 155 mounts a pair of pins 157 received in slots 158a of a finger 158. A coil spring 159 has one end thereof connected to the bracket 155 and the other end thereof connected to the finger 158 for urging the latter to the right, as viewed in FIG. 16, with corresponding ends of the slots 158a in engagement with the shank portions of the pins 157. As noted in FIG. 17, the finger 158 has an extension 158b positioned for abutting engagement with the portion 98e of the shiftable gate plate 98.

The shiftable plate 43 mounts another angle bracket 161, as by means of fasteners 162. The upstanding portion of this bracket plate mounts a pair of pins 163 received in slots 164a of a finger 164. A coil spring 165 has one end thereof connected to the bracket plate 161 and the other end thereof connected to the finger 164 for urging the latter to the left, as viewed in FIG. 16, with corresponding ends of the slots 164a abutting the shank portions of the pins 163. As noted in FIG. 17, the finger 164 has an extension 164b in abutting relation with the portion 98e of the shiftable gate plate 98.

The shiftable plate 143 mounts an upstanding pin 167 which is positioned to be engaged by the arm 116c of the lever 116. In like manner, the shiftable plate 143 mounts another upstanding pin 168 which is positioned to be engaged by the arm 121c of the lever 121.

Operation

Before describing the operation of the slide changing mechanism with a loaded container 18 in place for successively advancing slides in either forward or reverse sequences, it will be helpful first to describe the operation of some of the basic movable parts and the operation of the pushers 22, 23. These pushers serve not only as a means for engaging the container to advance the slides therein progressively toward the reciprocal slide changer but also serve as a means to select the forward or reverse modes of operation. In FIGS. 1, 2, 11 and 15, the pusher 22 is shown in what may be termed a cocked position and the pusher 23 is shown in what may be termed an operable position. With the pushers so disposed, the slide changing mechanism is selected for the reverse mode of operation. In FIG. 12, the various movable parts are shown as arranged when the pusher 23 is in the cocked position and the pusher 22 is in the operable position. When these pushers are thusly disposed, the slide changing mechanism is adapted for the forward mode of operation.

Assume that the pushers are in the positions illustrated in FIG. 12, i.e., disposed for forward operation, and that it is desired to establish the reverse mode of operation. The slide changer 40 is fully inserted which causes the handle portion 75 to engage the extension 130c of the locking plate 130 to remove the ear 130b from the notch 118g thereby to permit longitudinal movement of the bar 118. This movement of the slide changer also causes the magnet 90 on the tongue plate to be brought into engagement with the stop 126a formed on the arm 126. The operator grasps the wall 22b of the pusher 22 and withdraws the latter thereby bringing the pin 103 into engagement with arm 116a as shown in FIG. 14. Continued movement of the pusher 22 will cause rotation of the lever 116 thereby bringing the arm 116b into a position behind the pin 104. During this initial movement of the lever 116, no movement is imparted to the bar 118 by virtue of the lost motion connection afforded by the slot 118a. Continued rotation of the lever 116 in response to continued manual movement of the pusher 22 will bring the pin 117 into engagement with one end of the slot 118a thereby to cause movement of the bar 118 to the left as viewed in FIG. 14. Such movement of the bar 118 will cause immediate rotation of the lever 121 by reason of engagement of one end of the slot 118b with the pin 123. This movement of the lever 121 disengages the arm 121b from the pin 110 allowing the spring 112 to snap the pusher 23 toward the reciprocal slide changer, i.e., to the left as seen in FIG. 14.

At approximately the same time that the lever 116 serves to impart movement to the bar 118, the arm 116c comes into engagement with the pin 167 thereby to shift the plate 143 to the position shown in FIG. 11. Such movement of the shiftable plate 143 causes the cam block 144 to rotate from the position shown in FIG. 12 to the position shown in FIG. 11 by reason of the engagement between the rectilinear cam track 144a and the cam follower 154 on the slide changer bar 41.

The aforesaid movement of the bar 118 brings the pin formation 118e into camming engagement with the pin 125 thereby swinging the arm 126 whereupon the tongue plate 86 will be withdrawn slightly due to engagement of the stop 126a with the magnet 90. This movement of the plate 86 will allow the portion 86b thereof to separate from the ear 96d and snap from the left side of the latter to the right side thereof due to spring action of the plate portion 86b. This will result in proper positioning of the tongue plate relative to the ears 98c, 98d.

When the plate 143 has been fully shifted as viewed in FIG. 11, further movement of the pin 167 to the right will no longer be possible. This will prevent further rotation of the lever 116 and in turn prevent further withdrawal of the pusher 22 by reason of the engagement between the pin 103 and the arm 116a. This will indicate to the operator that the pusher 22 may be released whereupon the spring 112 will return this pusher to the cocked position with the pin 104 captured by the arm 116b as viewed in FIGS. 11 and 15. The other pusher 23 is in the operable position and the slide changing mechanism is adapted for the reverse mode of operation.

The aforesaid shifting movement of the plate 143 causes the finger extension 158b to be yieldably brought into engagement with the portion 98e of the shiftable gate plate 98 thereby to shift the latter for positioning the ears 98c and 98d to the right side of the gate opening as viewed in FIG. 19. Movement of the gate plate 98 in this direction is limited by abutting engagement of the cam follower 98f with the cam rib 73c as viewed in FIG. 21.

It will be understood that the slide changer 40 was in the fully inserted position during the aforesaid movements of the several parts. Assume that it is now desired to present the slides successively in the reverse direction. The pusher 22 will be in the cocked position and the pusher 23 will be in the operable position as just described. The pusher 23 is withdrawn slightly and the container 18 inserted in place with the flange 34 received in the guideway 35. The pusher 23 is then released allowing the spring 112 to bring the peaked surface 23a into engagement with the container wall 27 for urging the container 18 to the left, as viewed in FIG. 1. The container will be advanced in this direction until the foremost slide in the stack is brought into engagement with the slide changer 40, assuming that the latter is still in the inserted position. When the slide changer 40 has been withdrawn, the pusher 23 will act to advance the container 18 a further distance to the left for bringing the foremost slide 32a therein into engagement with the ears 98c, 98d and with the distal end of the tongue plate 86 as indicated in FIG. 27A. During this further movement of the container, the cutout corners defining the extension 28a clear the ears 98c, 98d and the recess 28b clears the distal end of the tongue plate 86.

FIGS. 26A, 27A show the arrangement of the several parts with the slide changer 40 withdrawn preparatory to advancing the foremost slide 32a into the gate. During withdrawal of the slide changer 40, the plate 143 was shifted to the left for bringing the finger extension 164b into yieldable engagement with the portion 98e of the shiftable gate plate 98 thereby to cause the cam follower 98f to be held against the side of cam rib 73a.

As the slide changer 40 commences movement toward the gate, corresponding movement is imparted to the slide 32a by reason of the engagement of the trailing edge of the latter with the slide changer pushing surfaces 76a, 77a. During initial movement of the slide changer toward the gate, the beveled portions of the bars 76, 77 engage the slide 32b, which is adjacent the slide 32a, thereby to rock the slide 32b and the remaining slides in the stack about the fulcrum defined by the formation 37 (FIG. 27B). This rocking action separates the slides 32a, 32b sufficiently so as to minimize, if not entirely eliminate, the possibility of edgewise interference between such slides during their relative sliding movement.

As the slide changer moves toward the gate, the plate 143 will be shifted to the right by reason of engagement between the pin 154 and the cam track 144a. This will cause the finger extension 158b to act on the shiftable gate plate 98 so as to hold the cam follower 98f into sliding engagement with one side of the cam rib 73b indicated in FIG. 26B. FIG. 27C shows the slide changer 40 advanced such that a substantial portion of the slide 32a is received within the guide tracks 63, 64 defining the projection gate. Note that the ears 98c, 98d have been separated slightly from the slide 32a; this separation is the result of the camming action of the rib 73b which is wider at one end thereof and therefore cams the gate plate 98 a small distance to the left during movement of the changer toward the gate. When the slide 32a is in the position shown in FIG. 27C, it is noted that the remaining slides in the stack have been returned to parallel relation with the slide 32a.

As the slide changer 40 continues movement toward the gate beyond the position thereof shown in FIG. 27C, further advance movement of the tongue plate 86 is prevented by reason of engagement of the magnet 90 with the stop 126b (FIG. 9); the arm cannot move by reason of engagement between the pin 125 and the recess 118d. At this same time, the tongue plate portion 86b is disposed to one side of the lower ear 98d (FIG. 24). As the slide changer 40 continues its movement in advancing the slide to the gate, the trailing marginal portion of such slide separates from the distal end of the shiftable tongue 86.

As noted in FIG. 9, which shows the slide changer 40 in its fully inserted position for holding a slide in the gate, the pushing surfaces 76a, 77a are extended beyond the distal end of the tongue plate 86; or in other words, the distal end of the plate 86 has been withdrawn from its normal position where it projects beyond the pushing surfaces 76a, 77a to a retracted position wherein the distal end of the plate 86 is disposed to the other side of such pushing surfaces. This relative movement of the tongue plate is permitted by the pin and slot mounting of the same.

During continued movement of the slide changer 40 toward the gate, the plate 143 continues to be cammed to the right as viewed in FIG. 16 thereby causing relative movement between the latter and the finger 158 for loading the associated coil spring 159. When the slide changer 40 is fully inserted to position the slide 32a in the gate for projection, the cam rib 73b will clear the cam follower 98f thereby allowing the spring biased finger 158 to shift the gate plate 98 to the right until the cam follower 98f abuts the inside surface of the cam rib 73c (FIG. 26C). This lateral shifting movement of the gate plate 98 results in the ears 98c, 98d being shifted to the right as seen in FIGS. 19 and 27D. This movement of the gate plate 98 will also cause corresponding movement of the distal end of the tongue plate 86 as the ear 98d engages the tongue portion 86b thereby to shift the tongue plate to the right in response to corresponding shifting movement of the gate plate 98. At this time, the ears 98c, 98d and the tongue plate 86 will be disposed to the right of the slide 32a in the projection gate.

As the slide changer 40 is withdrawn for returning the slide to the stack, the ears 98c, 98d and the tongue plate 86 will now be disposed between the slide 32a and the adjacent slide 32b as seen in FIG. 27E. Return movement of the slide changer 40 will cause corresponding movement to the slide by reason of engagement of the member 55 with the adjacent edge of the slide. During this initial return movement of the slide changer 40, the tongue plate 86 is held stationary by the action of the magnet 90 acting on the stop 126b, the spring 128 being sufficient in strength to prevent movement of the arm 126 under the action of the magnet. This holding action causes relative movement between the slide 32a and the distal end of the tongue plate 86 thereby to ensure that the leading end of such slide is disposed to the left of the tongue plate 86 before the latter is shifted to the left as will be explained hereinbelow.

During this return movement of the slide changer 40, the plate 143 will be shifted to the left thereby bringing the finger extension 164b into engagement with the gate plate portion 98e for urging the cam follower 98f into sliding engagement with the other side of the cam rib 73b (FIG. 26D). Since the side of the cam rib 73b which is engaged by the cam follower 98f is inclined, the finger 164 will be allowed to cam the ears 98c, 98d slightly to the left during return movement of the slide changer. However, these ears will remain to the right side of the slide 32a until the same has been fully returned to the stack in the container 18.

During continued return movement of the slide changer 40, the pins 80 through 82 will come into abutting engagement with ends of respective slots 83 through 85 thereby to cause corresponding movement of the tongue plate 86 overcoming the force developed by the magnet 90. At this time the leading edge of the slide will be engaged by the distal end of the tongue 86 as seen in FIG. 27E. This return movement of the slide changer causes the plate 143 to be shifted to the left by reason of the engagement between the pin 154 and the cam track 144a. This causes relative movement between the plate 143 and the finger 164 thereby loading the associated spring 165. While the slide changer 40 has been fully withdrawn for returning the slide 32a to the container 18, the cam follower 98f clears the cam rib 73b thereby allowing the finger 164 to shift the gate plate 98 to the left (FIGS. 18, 26E, 27F). The ears 98c, 98d will then be in position to cooperate with the tongue 86 for holding the slide 32b in position for being advanced to the gate during the next cycle of operation. The slide 32a is received in the space between the container wall 28, the ears 98c, 98d and the tongue plate 86.

It will be apparent that as the slide changer 40 is continued to be reciprocated, the slides 32 will be successively presented one at a time for the supply area on the right side of the slide changer to the gate and then returned to a take-up area in the container on the left side of the slide changer. It is noted that each slide is advanced from the container to the gate in its own plane and is returned to the container in that same plane. Each slide is not shifted from its plane of movement until it has been fully returned to the container. After the last slide has been returned to the container, the pusher 23 will slide the container 18 completely across the gate as the cutout corners forming the extension 27a will clear the ears 98c, 98d and the recess 27b will clear the distal end of the tongue plate 86.

The container 18 may be removed from the slide projector at any time during a projection sequence. To remove the container, the slide changer 40 is manually withdrawn as far as possible. Such manual withdrawal is possible as the j-bar 50 will separate from the motor driven pin 51 as explained above. During this outward manual movement, the leg extension 53a will come into engagement with the guide member 92 adjacent one side of the gate entrance. Continued outward movement of the slide changer 40 will cause the leg 53 to pivot about the pin 54 thereby to separate the foot 55 from the adjacent edges of the slides in the container to facilitate removal of the latter. After the slide changer has been fully withdrawn, the operator then grasps the finger 86a and/or magnet 90 for withdrawing the distal end of the tongue plate 86 from the container opening 30 thereby permitting separation of the container 18 from the slide projector.

If the operator desires to show slides in the forward direction or sequence, the slide changer is fully inserted for disengaging the ear 130b from the notch 118f thereby to permit longitudinal movement of the bar 118. The pusher 23 is then withdrawn to the cocked position whereupon the pusher 22 will be released to occupy the operable position thereof as shown in FIG. 12. This actuation of the pusher 23 will cause the plate 143 to be shifted to the left thereby rotating or rocking the cam block 144 from the position shown in FIG. 11 to the position shown in FIG. 12. With the cam block thusly disposed with respect to the plate 143, it will now be apparent that as the slide changer 40 is inserted, the plate 143 will shift to the left for loading the finger 164 against the shiftable gate plate 98. When the slide changer 40 is withdrawn, the plate 143 will be shifted to the right for loading the finger 158 to act on the shiftable gate plate 98.

The operation of the slide changing mechanism of the present invention in the forward sequence is illustrated in FIGS. 28A through 28E. With reference to FIG. 28A, it is seen that the foremost slide 32c in the supply area in the stack within container 18 is held against the ears 98c, 98d and the distal end of the tongue plate 86. As the slide changer commences its movement toward the gate, the bars 76, 77 rock the remaining slides in the supply area about the fulcrum defined by the formation 38 to separate the foremost slide 32c from the adjacent slide 32d. As the slide changer continues its movement toward the gate, the slides in the stack are returned to their parallel orientation with the slide 32c as seen in FIG. 28C.

When the slide 32c has been fully received between guide tracks 64, 65 defining the gate, the ears 98c, 98d are shifted from the right to the left of the slide as shown in FIGS. 18 and 28D. Such shifting of these ears causes corresponding shifting movement of the tongue plate 86 by reason of engagement of the ear 98d with the tongue plate portion 86b (FIG. 25). As the slide changer 40 is withdrawn for returning a slide to the take-up area of the stack in the container 18, the ears 98c, 98d are disposed, along with the distal end of the tongue plate 86, between the slide 32c and the slide 32d as seen in FIG. 28E.

It will be apparent that during continued reciprocation of the slide changer, the slides will be successively presented one at a time from the supply area of the stack on the left side of the slide changer to the gate and returned to the take-up area of the stack on the right side of the slide changer 40. It is noted that each slide is advanced from the stack to the gate in its own plane and returned to the stack in that same plane.

It will be understood that the operation of the various moving parts of the slide changing mechanism is the same in the forward sequence as in the reverse sequence. It will be apparent that it is possible to shift from the forward to the reverse sequence of operation, or vice versa, at any time during a projection sequence. To effect such change in direction, it is only necessary to insert the slide changer 40 fully and actuate the pushers 22, 23 as appropriate to select the desired direction in which the slides are to be successively presented to the gate.

We claim:

1. In a slide changing mechanism of the type having a reciprocally mounted slide changer for advancing slides one at a time from a stack of such slides to a gate and for returning each slide to the stack, the improvement comprising:
   a. means cooperating with said slide changer for advancing a first slide in a plane containing said slide from said stack to said gate during corresponding movement of said slide changer; and
   b. other means cooperating with said first mentioned means for shifting at least a portion of the latter transversely of the path of travel of said slide changer and thereby permitting return movement of said first slide in said plane.

2. The improvement according to claim 1 wherein said other means are operated in response to movement of said slide changer.

3. The improvement according to claim 1 further defined by selectively operated reversible means cooperating with said first mentioned means for alternately shifting the latter through a first cycle for successively advancing said slides in a first sequence and through a second cycle for successively advancing said slides in a second sequence opposite said first sequence.

4. In a slide changing mechanism for advancing slides one at a time from a supply area of a holder of a stack of such slides to a gate and for returning the slides to a take-up area of the holder, the improvement comprising:
   a. a slide changer reciprocally mounted for movement back and forth between said holder and said gate; and
   b. means cooperating with said slide changer and shifting relative to a slide in the gate and transversely of the direction of movement of the slide changer in response to movement thereof for advancing the foremost slide in said supply area to said gate upon corresponding movement of the slide changer and for returning said slide to said take-up area upon corresponding movement of the slide changer.

5. The improvement according to claim 4 further defined by selectively operated reversible means cooperating with said first mentioned means and operable in a first mode for shifting the latter from a first position to a second position and then back to said first position in response to a full cycle of said slide changer thereby to advance said foremost slide to the gate and to return the same to said take-up area, said reversible means being alternately operable in a second mode for shifting said first mentioned means from said second position to said first position and then back to said second position in response to a full cycle of said slide changer for advancing the foremost slide in said take-up area to the gate and for returning the last mentioned slide to said supply area.

6. The improvement according to claim 5 further defined by:

a. first and second pressure applying means adapted in operable positions thereof to advance the slides in said supply and take-up areas, respectively, toward said slide changer;
b. actuating means for alternately placing said pressure applying means into their operable positions; and
c. said actuating means being connected with said reversible means for alternately establishing said first and second modes substantially simultaneously with alternate placement of said first and second pressure means in said operable positions thereof, respectively.

7. In a slide changing mechanism of the type having a reciprocally mounted slide changer for advancing slides one at a time from a holder for a stack of such slides to a gate and for returning each slide to the holder, the improvement comprising, means mounted for shifting movement laterally of the direction of movement of said slide changer and dividing said holder into supply and take-up areas, at least a portion of said means being mounted on said slide changer for movement therewith and for said shifting movement relative thereto.

8. The improvement according to claim 7 further defined by:
a. said slide changer having a surface for pushing engagement with the edge of the foremost slide in said supply area;
b. said portion of said means being disposed adjacent said surface; and
c. another portion of said means being mounted adjacent the entrance of said gate for shifting movement in response to movement of said slide changer.

9. A reversible slide changing mechanism for alternately advancing slides one at a time from a first area of a holder for a stack of such slides to a gate and for returning the slides to a second area of the holder or vice versa, the improvement comprising:
a. a slide changer reciprocally mounted for movement back and forth between a first position wherein the same advances a slide into the gate and a second position wherein the slide changer is withdrawn from the gate for returning a slide to the holder, which slide changer divides said holder into said first and second areas; and
b. reversible means selectively operable when said slide changer is in said first position and including means shiftable relative to the slide changer transversely thereof for returning a slide in the gate to either one of said first or second areas upon movement of said slide changer from said first position to said second position.

10. The improvement according to claim 9 wherein a portion of said shiftable means is carried by said slide changer.

11. The improvement according to claim 10 wherein another portion of said shiftable means is mounted adjacent the entrance of said gate.

12. In a slide changing mechanism of the type having a slide changer reciprocally mounted for movement in a first direction for advancing a slide from a stack of such slides to a gate and in a second direction for returning each slide to the stack, the improvement comprising:

a. first means mounted adjacent the entrance of said gate by support means for shifting movement transversely of the path of travel of said slide changer;
b. said slide changer having a pushing surface for engagement with the edge of the one slide in said stack which is positioned to be advanced to said gate;
c. second means on said slide changer, said second means having at least a portion thereof mounted for shifting movement transversely of the path of travel of said slide changer and for movement relative to said slide changer back and forth between a normal position wherein said portion extends beyond said pushing surface and a retracted position wherein said portion is withdrawn from said pushing surface;
d. means for holding a stack of slides such that a face of said one slide is held against said first means and said second means when said slide changer has completed its movement in said second direction;
e. other means acting on said second means as said slide changer approaches the end of its path of travel in said first direction for moving the former to said retracted position thereby disengaging said second means from said one slide; and
f. still other means operable in response to movement of said slide changer in said first direction for shifting said first and second means such as that upon return of said one slide to the stack in response to return movement of said slide changer in its second direction, said first and second means are disposed between said one slide and the slide which was in adjoining relationship with said one slide.

13. The improvement according to claim 12 wherein said second means comprises a thin plate adapted in said normal position thereof for engaging only a marginal portion of said one slide adjacent said edge thereof.

14. The improvement according to claim 13 wherein said plate is shifted in response to shifting movement of said first means.

15. A slide transparency container for use with a slide changing mechanism of the type having a reciprocal slide changer for advancing slides one at a time from a stack of such slides to a gate and fore returning the slides to the stack, said container comprising:
a. a pair of end walls and top and bottom walls extending therebetween for containing a plurality of slides in stack form between said end walls in parallel relation with the latter, said bottom wall serving as a base support for the stack of slides;
b. means defining an opening on one side of said container for ingress and egress of each slide on said stack, which opening has a length equal to the distance between said end walls;
c. other means including a rib extending between said end walls and defining an opening on the side of said container opposite said one side to permit entrance of said slide changer into the space between said walls, said last mentioned opening having a length equal to the distance between said end walls and a height less than the distance between said top and bottom walls, said rib acting as a stop to prevent movement of the slides through said second mentioned opening; and
d. one of said end walls having a rectilinear formation extending at least a portion of the distance between said top and bottom walls, which formation is intermediate the side edges of said one end wall and thereby acts as a fulcrum to permit rocking of the stack of slides thereabout.

16. The container according to claim 15 wherein the other end wall has a rectilinear formation extending at least a portion of the distance between said top and bottom walls, which last mentioned formation is intermediate the side edges of said other end wall and thereby acts as a fulcrum, alternately with said first mentioned formation, to permit rocking of the slides thereabout.

17. In a slide changing mechanism of the type having a reciprocally mounted slide changer for advancing slides one at a time from a stack of such slides to a gate and for returning each slide to the stack, the improvement comprising:
   a. support means mounting said slide changer for reciprocal movement back and forth between a first position wherein the same enters the gate for advancing a slide thereinto and a second position wherein the slide changer is withdrawn from the gate for returning a slide to the stack;
   b. shiftable means cooperating with said slide changer for advancing a slide in the stack to the gate in response to movement of said slide changer from said second position to said first position and for returning the slide to the stack in response to movement of said slide changer from said first position to said second position;
   c. a container detachably mounted by said support means and adapted to receive said stack of slides, which container is generally in the form of a parallelopiped having end walls and sides defined by openings permitting movement of said slide changer therethrough, which openings extend substantially the distance between said end walls; and
   d. said support means mounting yieldable means acting against one of said end walls for holding the stack of slides between said one end wall and said shiftable means when said slide changer is in said second position, which shiftable means cooperates with the other end wall of said container to define a space for receiving slides returned from said gate.

18. A reversible slide changing mechanism for successively presenting slides one at a time from a stack of such slides alternately in forward and reverse sequences, the improvement comprising:
   a. a slide changer reciprocally mounted for movement back and forth between a first position wherein the same advances a slide into the gate and a second position wherein the slide changer is withdrawn from the gate for returning a slide to the stack;
   b. reversible means including shiftable means alternately operable in first and second modes for returning a slide to one or the other sides of said slide changer, respectively, upon return movement of the latter from said first position to said second position;
   c. first and second elements disposed one on each side of said slide changer;
   d. means mounting each of said first and second elements for independent movement transversely of the direction of movement of said slide changer for alternately advancing slides toward respective opposite sides of the same;
   e. actuating means includes biasing means operable in response to manual movement of said first element to a cocked position away from said slide changer for releasably holding said first element in said cocked position and substantially simultaneously biasing said second element toward the slide changer, which biasing means are also operable in response to manual movement of said second element to a cocked position away from said slide changer for releasably holding said second element in said last mentioned position thereof and substantially simultaneously biasing said first element toward the slide changer; and
   f. means connecting said actuating means with said reversible means for alternately establishing said first and second modes in response to movement of said first and second elements to respective cocked positions thereof.

19. The improvement according to claim 18 further defined by interlock means operated in response to movement of said slide changer away from said first position thereof thereby to prevent manual movement of said first and second elements to the cocked positions thereof except when the slide changer is in said first position thereof.

20. The improvement according to claim 18 wherein said shiftable means are alternately operable in said first and second modes in response to reciprocal movement of said slide changer.

21. The improvement according to claim 20 wherein a portion of said shiftable means is carried by said slide changer.

22. The improvement according to claim 21 wherein another portion of said shiftable means is mounted by support means adjacent the entrance of said gate for movement in response to movement of said slide changer.

23. In a slide changing mechanism of the type having a slide changer mounted for reciprocal movement in a first direction for advancing slides from a stack of such slides to a gate and in a second direction for returning each slide to the stack, the improvement comprising:
   a. means including shiftable means cooperating with said slide conveyor for successively presenting slides one at a time to be advanced to said gate in response to movement of said slide changer in said first direction, which shiftable means are mounted for reciprocal movement relative to said slide changer transversely thereof in a first direction and in a second direction opposite said first direction;
   b. first cam means engaging said slide changer and a portion of said shiftable means for preventing said reciprocating movement of the latter except when the former has reached the end of its path of travel in each of said first and second directions of movement thereof;
   c. actuating means including a pair of biasing means arranged to engage said portion of said shiftable means, which actuating means are mounted for reciprocal movement transversely of the direction of slide changer movement; and
   d. second cam means engaging said slide changer and said actuating means for reciprocating the latter in response to reciprocating movement of the former, said cam means including a cam track occupying a predetermined angular disposition to bring one of said biasing means into engagement with said portion of said shiftable means and as said slide changer is moved in said first direction thereby to load said one biasing means for moving said portion of said shiftable means in said first direction when said slide changer has completed its movement in said first direction, said second cam means also serving to bring the other of said biasing means into engagement with said portion of said shiftable means as said slide changer is moved in said second direction thereby to load said other biasing means for moving said portion of said shiftable means in said second direction when said slide changer has completed its movement in said second direction.

24. The improvement according to claim 23 wherein another portion of said shiftable means is carried by said slide changer and is engaged by said first mentioned portion when said slide changer has completed its movement in said first direction whereby shifting movement of said first mentioned portion causes corresponding movement of said last mentioned portion.

25. The improvement according to claim 23 wherein said cam track is movably mounted for occupying another angular disposition alternately with said predetermined angular disposition to bring said other biasing means into engagement with said portion of said shifting means as said slide changer is moved in said first direction thereby to load said other biasing means for moving said portion of said shiftable means in said second direction when said slide changer has completed its movement in said one direction thereof, said cam track in said another angular disposition thereof also being arranged to bring said one biasing means into engagement with said portion of said shiftable means as said slide changer is moved in said second direction thereby to load said one biasing means for moving said portion of said shiftable means in said first direction when said slide changer has completed its movement in said second direction.

26. The improvement according to claim 25 further defined by:
 a. first and second elements disposed one at each side of said slide changer;
 b. means mounting each of said first and second elements for independent movement transversely of the direction of movement of said slide changer for alternately advancing slides toward respective opposite sides of the same;
 c. operating means including biasing means operable in response to manual movement of said first element to a position away from said slide changer for substantially simultaneously biasing said second element toward said slide changer, which biasing means are also operable in response to manual movement of said second element to a position away from said slide changer for substantially simultaneously biasing said first element toward said slide changer; and
 d. means connecting said operating means with said actuating means for moving said cam track to said predetermined angular disposition thereof in response to movement of said first element to said position away from said slide changer and for movement of said cam track to said another disposition thereof in response to movement of said second element to said position away from said slide changer.

27. In a slide changing mechanism of the type having a reciprocally mounted slide changer for advancing slides one at a time from a stack of such slides to a gate and for returning each slide to the stack, an improved locking means to prevent retrograde movement of the slide changer after movement in one direction has commenced comprising a pivotally mounted catch movable between a normally locked position in which it engages the slide changer to prevent inward movement thereof, but permits outward movement, and an unlocked position in which it disengages the slide changer to permit both inward and outward movement thereof; a reciprocally mounted catch release member movable between a first position in which it engages and urges the catch into its unlocked position, and a second position in which it permits the catch to return to its locked position; and means associated with said slide changing mechanism and movable therewith to engage and move the catch release member into its first position when the slide changing mechanism is fully withdrawn and, to engage and move the catch release member into its second position when the slide changing mechanism is fully inserted.

* * * * *